Patented Mar. 30, 1954

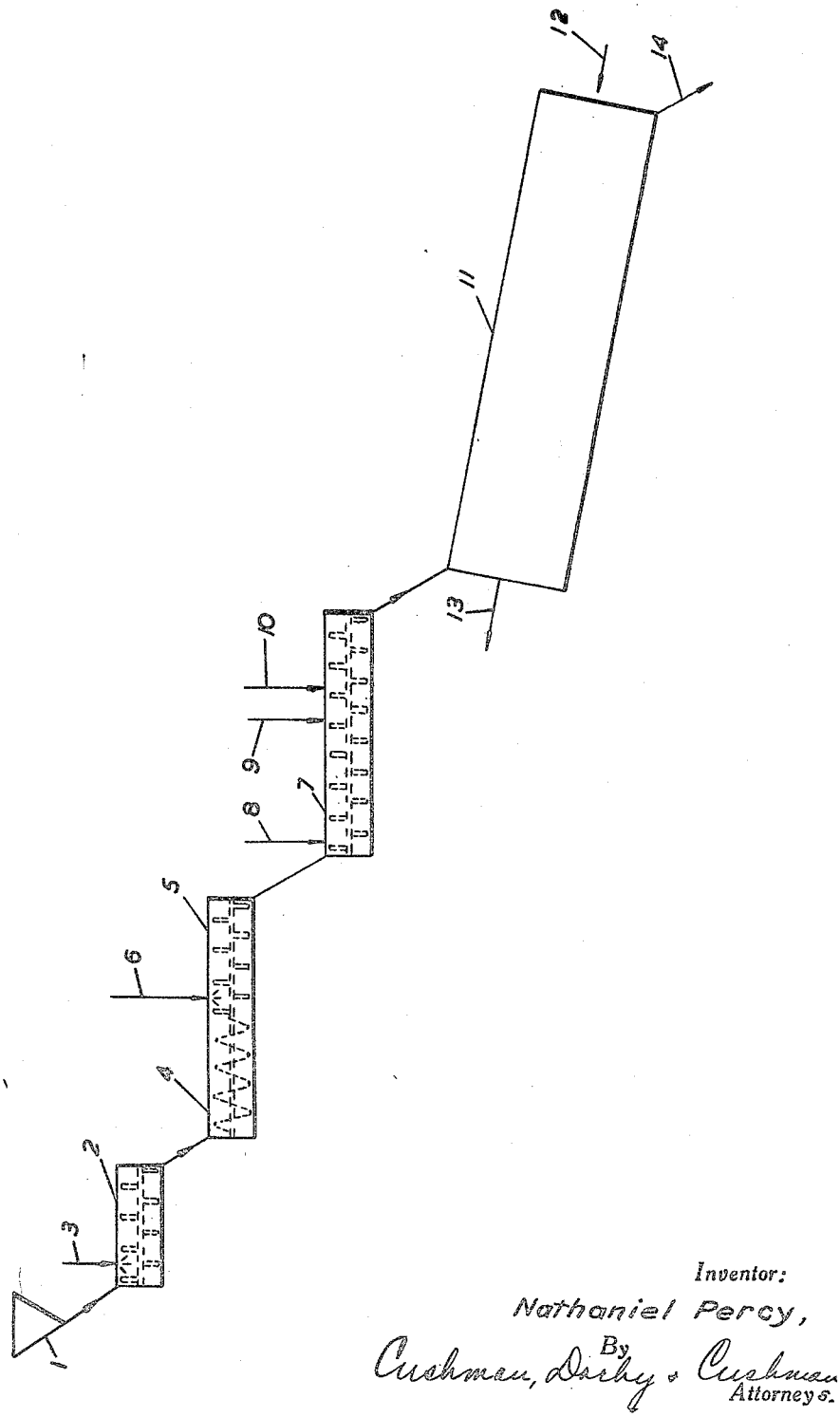

2,673,796

UNITED STATES PATENT OFFICE 2,673,796

FERTILIZERS

Nathaniel Percy, Norton-on-Tees, England, assignor to Imperial Chemical Industries Limited, a corporation of Great Britain Application August 20, 1951, Serial No. 242,625

Claims priority, application Great Britain December 27, 1950

13 Claims. (Cl. 71—39)

This invention relates to the production of complete fertilizers.

Numerous processes have been suggested for producing a complete fertilizer by treating mineral rock phosphate with nitric acid, then treating the reaction product with ammonia and adding potassium salts. In all these processes however difficulties arise owing to the plastic nature of the mass resulting from the treatment of the mineral rock phosphate with nitric acid.

Many proposals have been made with a view to overcoming these difficulties. For example, it has been proposed to react mineral rock phosphate with a mixture of nitric and sulphuric acids or of nitric acid and alkali sulphates in attempts to obtain a reaction product which may be satisfactorily granulated to give a complete fertilizer of desired grading which may be packed in bags and stored without deterioration.

It would appear that these results have not yet been achieved to the extent desirable in a commercial product.

We have found that the desired results may be obtained by the process of the present invention.

According to the present invention there is provided a process for the production of granular complete fertilizers which comprises the steps of reacting ground mineral rock phosphate with insufficient aqueous nitric acid for the complete conversion to mono-calcium phosphate of the tri-calcium phosphate content of the mineral rock, the reaction with the acid being carried out in two stages, the first being of short duration not exceeding 2 minutes under conditions of rapid mixing and during which the whole of the required acid is added, and the second for a period of about 12 to 15 minutes under conditions of moderate agitation; then adding with continued mixing over a period of about 10 minutes, aqueous ammonia to convert substantially all the mono-calcium phosphate produced in the reaction with nitric acid to di-calcium phosphate, while maintaining the mass at a temperature of not more than 70° C.; adding with continued mixing over a period of from 5 to 10 minutes, ground ammonium sulphate in an amount not less than that required to convert unreacted calcium nitrate to calcium sulphate and ammonium nitrate and muriate of potash in an amount to give the desired equivalent of potash in the final product; adding, with continued mixing, dried material from the final step of the process in such quantity depending on the concentration of the nitric acid and aqueous ammonia employed to give a mixture having a water content of between 6% and 12% by weight; said mixture being then passed to a rotary drier or driers in which the granulation is completed and the granules are dried by a counter-current stream of hot gas so that the temperature of the granulated material leaving the drier or driers is not higher than 100° C.

The granulated material leaving the drier or driers is passed to conventional screens for grading as desired, the oversize being crushed and the fines, with any additional graded material necessary to make up the desired quantity, are returned to the appropriate step of the process. In order to minimise the tendency of the hot granules leaving the drier or driers to agglomerate it is preferred to cool them to about room temperature, for example, by passing them through a rotary cooler, before screening.

The quantity of nitric acid employed will, of course, vary with the tri-calcium phosphate content of the mineral rock, the nature of the impurities present, the degree of conversion desired and on the fineness to which the rock is ground. For example, when using mineral rock containing about 75% by weight of tri-calcium phosphate, satisfactory results may be obtained by using between 50% to 75% by weight of acid, in terms of 100% $HNO_3$, on the total weight of the mineral rock phosphate being reacted.

The use of a quantity of nitric acid corresponding to the lower limit of the above-mentioned range will give a conversion of about 55% of the tri-calcium phosphate content of the mineral rock and a quantity of acid corresponding to the upper limit will give about 96% conversion. It has been found undesirable to use a quantity of acid which will give a conversion of more than 96% as above this reaction product becomes much more fluid and in consequence difficulties arise in the operation of the process, particularly as it becomes necessary to increase the amount of dried material which is returned to the process from the final step and/or to prolong the drying. In addition it has been found that if the amount of acid is increased above that required to give 96% conversion of the tri-calcium phosphate content of the mineral rock there is substantially no further increase in the proportion of the total $P_2O_5$ in the final product which is soluble in 2% citric acid.

In order to obtain efficient utilisation of the nitric acid it is desirable for the mineral rock to be ground to pass A. S. T. M. Standard mesh sieve No. 50 ($297\mu$) with at least 75% by weight to pass A. S. T. M. Standard mesh sieve No. 120 ($125\mu$). Preferably, the rock is ground so that at least 85% passes A. S. T. M. Standard mesh sieve No. 120 ($125\mu$) and at least 50% passes A. S. T. M. Standard mesh sieve No. 200 ($74\mu$). It has been found that with the mineral rock ground to less than $297\mu$ and at least 75% less than $125\mu$ the quantity of nitric acid required to give a desired degree of conversion of the tri-calcium phosphate content may be estimated from the analysis of the rock with an accuracy within normal limits of error by allowing the full theoretical quantities of acid required to react with the impurities which are calcium or magnesium compounds other than calcium fluoride and 70% only of the theoretical quantities required to react with other impurities, such as aluminum, iron and sodium compounds, with the exception of silica and organic matter.

For example, with Florida rock of the analysis, $P_2O_5$, 34.3% (equivalent to 74.8% $Ca_3(PO_4)_2$)
CaO, 49.06%
$CO_2$, 2.84% (equivalent to 6.45% $CaCO_3$)
$SO_3$, 0.50% (equivalent to 0.87% $CaSO_4$)
MgO, 0.22%
$Al_2O_3$, 1.03%
$Fe_2O_3$, 0.93%
$Na_2O$, 0.64%
F, 2.43% (equivalent to 5.00% $CaF_2$)
$SiO_2$, 5.85% the quantity of nitric acid per 100 parts of rock, in terms of 100% $HNO_3$, for 96% conversion of the tri-calcium phosphate to mono-calcium phosphate may be estimated as follows:

74.8 parts of $Ca_3(PO_4)_2$ require $\frac{4 \times 63}{310} \times 74.8 \times 0.96 = 58.3$ parts $HNO_3$ 6.45 parts of $CaCO_3$ require $\frac{2 \times 63}{100} \times 6.45 = 8.1$ parts $HNO_3$ 0.87 parts of $CaSO_4$ require $\frac{2 \times 63}{136} \times 0.87 = 0.8$ parts $HNO_3$ 0.22 parts of MgO require $\frac{2 \times 63}{40.3} \times 0.22 = 0.7$ parts $HNO_3$ 1.03 parts of $Al_2O_3$ require $\frac{6 \times 63}{102.2} \times 1.03 \times 0.7 = 2.7$ parts $HNO_3$ 0.93 parts of $Fe_2O_3$ require $\frac{6 \times 63}{159.7} \times 0.93 \times 0.7 = 1.5$ parts $HNO_3$ 0.64 parts of NaO require $\frac{2 \times 63}{62} \times 0.64 \times 0.7 = 0.9$ parts $HNO_3$ 73.0 parts $HNO_3$ The concentration of the nitric acid may be varied but it has been found convenient to use acid having a concentration between 45% and 65% by weight of aqueous solution. Preferably the concentration should be between 50% and 55% by weight in order to keep the water content low and to avoid the losses of acid as fumes when higher concentrations are used.

The quantity of aqueous ammonia used will, of course, depend upon its concentration and the degree of conversion to mono-calcium phosphate of the tri-calcium phosphate content of the mineral rock.

The concentration of the aqueous ammonia may be varied over a wide range, for example from 20% to 40% by weight of ammonia, but it is preferred to employ a concentration of about 30% by weight.

The temperature of the reaction mass during the addition of aqueous ammonia should not exceed 70° C. and should preferably be in the range of 50° C. to 60° C.

The ammonium sulphate used in the process of the present invention may be any commercial crystalline ammonium sulphate. The ammonium sulphate should be ground preferably to less than 0.5 mm.

The muriate of potash used in the process may be any commercial crystalline product containing from about 40% to 60% equivalent of $K_2O$. Such commercial product is generally sufficiently fine to be used as received but may, if desired, be ground before use in the process.

It has been found that in order to obtain satisfactory results the stage at which the addition of the muriate of potash is made is important. Thus, if the potassium chloride is added prior to the ammoniation step it reacts with the acid mono-calcium phosphate produced by the action of the nitric acid on the mineral rock phosphate with substantial evolution of hydrogen chloride and the granules of the final product are weak and therefore unsatisfactory.

However, if the addition of muriate of potash is made after the ammoniation step and preferably between the steps of adding ammonium sulphate and that of adding dried material from the final step of the process, there is substantially no evolution of hydrogen chloride and the final granular product is of satisfactory strength.

The quantity of dried material from the final step of the process which is returned to the step of the process before the drier or driers, and which will normally include the fines from the final screening, will, as before mentioned, be such as to give a product having a moisture content of between 6% and 12% by weight. It has been found convenient to arrange for the concentration of the nitric acid and aqueous ammonia used in the process to be such that the quantity of dried material returned is between 1 and 4 times by weight of the total of the other materials fed to the process.

The process of the present invention may be carried out batchwise, but it is preferred to operate in a continuous manner.

Batchwise operation may be carried out in a vessel which is provided with suitable means, for example, a stirrer or other agitator or agitators, by which the first stage of reacting the mineral rock with the nitric acid may be carried out under the desired conditions of rapid mixing and the subsequent operations of moderate agitation and continued mixing may be effected by means of a change speed gear or by the operation of a second stirrer and/or agitators.

For operating the process in a continuous manner it is preferred to arrange a separate mixer, which is preferably a paddle mixer, for the first stage of the reaction of the mineral rock with the nitric acid followed by a mixer, which is preferably a continuous or interrupted screw mixer, in which the second stage of the reaction of the mineral rock with the nitric acid is carried out and further mixers, which are preferably paddle mixers, in which the continued mixing with the addition of aqueous ammonia, ammonium sulphate, muriate of potash and returned dried material, is carried out. The mixer in which the aqueous ammonia is added is provided with means, for example a water jacket, for maintaining the reaction mass at a temperature not exceeding 70° C.

If desired, some adjustment of the temperature of the reaction mass may be arranged to take place in the screw mixer in which the second stage of the reaction of the mineral rock phosphate with the nitric acid is carried out, for example by providing a water jacket to at least a portion of the length of the screw mixer at the end from which the reaction mass passes to the paddle mixer in which the addition of aqueous ammonia takes place.

In a preferred continuous manner of carrying out the process of the present invention it has been found convenient to arrange the continuous or interrupted screw mixer, in which the second stage of the reaction of the mineral rock with the nitric acid is conducted, and the paddle mixer, in which the addition of aqueous ammonia is made, to be in a common casing and to have a common shaft.

Similarly it has been found convenient to arrange the paddle mixers, in which the ammonium sulphate, muriate of potash and returned dried material are respectively added, to be in a common casing and to have a common shaft.

It will be understood that in all cases the various mixers will be proportioned and their speeds arranged to give the desired reaction and mixing times for each stage and/or step of the process and to give the desired rate of flow of the materials through the plant.

A preferred form of apparatus for carrying out the process of the present invention is shown diagrammatically in the accompanying drawing.

Referring to the drawing numeral 1 is a hopper from which ground mineral rock phosphate is fed to the paddle mixer 2 to which aqueous nitric acid is also fed through pipe 3 at the desired rate. The longitudinal shaft of the paddle mixer 2 is driven, by any convenient means, at high speed in order to achieve a short time, rapid mixing of the mineral rock and nitric acid. The reaction mixture passes from the paddle mixer 2 into the screw mixer 4, the shaft of which is driven at moderate speed to give a moderate agitation to the reaction mixture. The reaction mixture passes from the screw mixer 4 into the paddle mixer 5 into which there is also fed aqueous ammonia through the pipe 6. The screw mixer 4 and the paddle mixer 5 are indicated as being in a common casing and having a common shaft. The paddle mixer 5 is provided with means, not shown, for maintaining the reaction mass at a temperature not exceeding 70° C. The material leaving the paddle mixer 5 passes into the paddle mixer 7 which essentially comprises two sections into the first of which ground ammonium sulphate is fed at 8 at the desired rate and into the second section is fed at 9 the desired quantity of muriate of potash and at 10 the desired quantity of dried material from the final step of the process. The material leaving the paddle mixer 7 passes into the drier 11 in which granulation is completed and the granules are dried by hot gas which enters the drier at 12 and leaves it at 13. The granulated material leaves the drier at 14 and passes to a cooler and/or conventional screens not shown on the drawing.

The continuous manner of carrying out the process of the present invention is described in the following example by reference to the accompanying drawing.

*Example*

Morocco rock phosphate having the analysis,

| | Percent |
|---|---|
| $Ca_3(PO_4)_2$ | 75.1 |
| $CaCO_3$ | 8.3 |
| $CaF_2$ | 8.2 |
| $CaSO_4$ | 2.6 |
| $MgO$ | 0.7 |
| $Na_2O$ | 0.9 |
| $Fe_2O_3$ | 0.3 |
| $Al_2O_3$ | 0.6 |
| $SiO_2$ | 0.9 |
| Organic matter | 0.8 | was ground so that all passed A. S. F. M. Standard mesh sieve No. 50 (297μ) with 75% to pass A. S. T. M. Standard mesh sieve No. 120 (125μ).

The quantity of nitric acid (as 100% $HNO_3$) required for 94% conversion of the tri-calcium phosphate content was estimated, as hereinbefore described, to be 76 parts by weight of acid per 100 parts by weight of the rock.

The ground rock was fed at the rate of 100 pounds per hour from the hopper 1 into the paddle mixer 2. Nitric acid of a concentration of 50% by weight of aqueous solution was also fed into the paddle mixer 2 at the rate of 152 pounds per hour by means of the pipe 3. The speed of the mixer shaft was arranged so as to give a retention time of the reactants in the mixer of one minute. The fluid reaction mass passed from the paddle mixer 2 into the screw mixer 4, the shaft of which was driven at moderate speed to give a retention time of 15 minutes. The reaction mass passed from the screw mixer 4 into the paddle mixer 5 which was arranged in a common casing and on a common shaft with the screw mixer 4, the proportions of the paddle mixer being such as to give a retention time of about 10 minutes. The casing of the combined mixers 4 and 5 was provided with a water jacket by means of which the temperature of the reaction mass passing through was reduced to and maintained between 50° and 60° C., particularly during the addition of aqueous ammonia of 30% concentration at the rate of 24 pounds per hour which was passed into the paddle mixer 5 through the pipe 6. The fluid ammoniated product passed from the paddle mixer 5 to the paddle mixer 7 into the first section of which ammonium sulphate, ground to pass A. S. T. M. Standard mesh sieve No. 35 (0.5 mm.), was added by means of the pipe 8 at the rate of 33 pounds per hour. Into the second section of the paddle mixer there were added muriate of potash at the rate of 60 pounds per hour through the inlet 9 and dried material, including fines from the screening of the dried product through the inlet 10 at the rate of 1200 pounds per hour. The retention time of the materials in each of the two sections of the paddle mixer 7 was about 5 minutes.

The partially granulated product from the paddle mixer 7 had a moisture content of 7% and was passed into the rotary drier 11 in which granulation was completed and the granules were dried by a stream of hot air which entered the drier at 12 and left it at 13. The granules passed from the drier at 14 at a temperature of about 75° C. and after being passed through an air cooler were graded between 1 mm. and 4 mm. and gave 25% by weight of granules of this grading, 30% oversize and 45% fines. The oversize granules were crushed and returned with the fines to the paddle mixer 7.

The analysis of the granulated product was:

| | Percent |
|---|---|
| Total $P_2O_5$ | 13.2 |
| 2% citric acid soluble $P_2O_5$ | 12.0 |
| Water soluble $P_2O_5$ | 1.2 |
| Nitrogen | 11.2 |
| $K_2O$ | 11.8 |
| Free water | 1.3 |

I claim:

1. A process for the production of granular complete fertilizers which comprises the steps of reacting ground mineral rock phosphate with insufficient aqueous nitric acid for the complete conversion to monocalcium phosphate of the tricalcium phosphate content of the mineral rock, the reaction with the acid being carried out in two stages, the first being of short duration not exceeding 2 minutes under conditions of rapid mixing and during which the whole of the required acid is added, and the second for a period of less than 15 minutes under conditions of moderate agitation; then adding with continued mixing over a period of less than 10 minutes, aqueous ammonia to convert substantially all the mono-calcium phosphate produced in the reaction with nitric acid to di-calcium phosphate, while maintaining the mass at a temperature of not more than 70° C.; adding with continued mixing over a period of less than 10 minutes, ground ammonium sulphate in an amount not less than that required to convert unreacted calcium nitrate to calcium sulphate and ammonium nitrate and muriate of potash in an amount to give the desired equivalent of potash in the final product; adding, with continued mixing, dried material from the final step of the process in such quantity depending on the concentration of the nitric acid and aqueous ammonia employed to give a mixture having a water content of between 6% and 12% by weight; said mixture being then passed to at least 1 rotary drier in which the granulation is completed and the granules are dried by a counter-current stream of hot gas so that the temperature of the granulated material leaving the drier is not higher than 100° C.

2. A process as claimed in claim 1 in which the granulated material leaving the drier is screened to desired grading, the oversize granules are crushed and together with the fines, and if necessary with any additional graded material to make up the desired quantity, are returned to the step of the process immediately before the drying step.

3. A process as claimed in claim 1 in which the hot granules leaving the drying step are cooled to about room temperature before screening.

4. A process as claimed in claim 1 in which the quantity of nitric acid used is sufficient to react with the impurities present in the mineral rock and to convert not more than 96% of the tri-calcium phosphate content of the rock to mono-calcium phosphate.

5. A process as claimed in claim 1 in which the concentration of the nitric acid is between 45% and 65% by weight of aqueous solution.

6. A process as claimed in claim 1 in which the concentration of the aqueous ammonia is between 20% and 40%.

7. A process as claimed in claim 1 in which the temperature of the reaction mass during the addition of aqueous ammonia is maintained at a temperature in the range of 50° to 60° C.

8. A process as claimed in claim 1 in which the ammonium sulphate used is ground to less than 0.5 mm.

9. A process as claimed in claim 1 in which the muriate of potash used is a commercial crystalline product containing from about 40% to 60% equivalent of $K_2O$.

10. A process as claimed in claim 1 in which the quantity of dried material returned from the final step of the process to the step before the drying step is between 1 and 4 times by weight of the total of the other materials fed to the process.

11. A process as claimed in claim 1 in which the muriate of potash is added between the steps of adding ammonium sulphate and that of adding dried material from the final step of the process.

12. A process as claimed in claim 1 in which the mineral rock phosphate is ground to pass A. S. T. M. Standard mesh sieve No. 50 with at least 75% by weight of the ground mineral rock ground to pass A. S. T. M. Standard mesh sieve No. 120.

13. A process as claimed in claim 12 in which at least 85% by weight of the ground mineral rock is ground to pass A. S. T. M. Standard mesh sieve No. 120 and at least 50% is ground to pass A. S. T. M. Standard mesh sieve No. 200.

NATHANIEL PERCY.

References Cited in the file of this patent

UNITED STATES PATENTS

| Number | Name | Date |
|---|---|---|
| 1,854,291 | Burdick | Apr. 19, 1932 |

FOREIGN PATENTS

| Number | Country | Date |
|---|---|---|
| 282,330 | Great Britain | May 21, 1928 |
| 355,637 | Great Britain | Aug. 27, 1931 |
| 391,495 | Great Britain | May 1, 1933 |
| 615,476 | Great Britain | Jan. 6, 1949 |